United States Patent [19]

Janicek

[11] Patent Number: 5,440,692

[45] Date of Patent: Aug. 8, 1995

[54] METHOD OF DYNAMICALLY EXPANDING OR CONTRACTING A DB2 BUFFER POOL

[75] Inventor: David L. Janicek, Stafford, Tex.

[73] Assignee: BMC Software, Inc., Houston, Tex.

[21] Appl. No.: 970,337

[22] Filed: Oct. 27, 1992

[51] Int. Cl.$^6$ ............................................. G06F 12/00
[52] U.S. Cl. .................... 395/700; 395/600; 395/481; 395/494; 364/DIG. 1; 364/238.6; 364/243.4; 364/243.41; 364/245; 364/245.1; 364/245.31
[58] Field of Search .................. 395/425, 250, 600

[56] References Cited

U.S. PATENT DOCUMENTS

| | | | |
|---|---|---|---|
| 4,422,145 | 12/1983 | Sacco et al. | 395/425 |
| 4,885,680 | 12/1989 | Anthony et al. | 395/425 |
| 5,093,912 | 3/1992 | Dong et al. | 395/650 |
| 5,179,662 | 1/1993 | Corrigan et al. | 395/250 |
| 5,237,661 | 8/1993 | Kawamura et al. | 395/250 |

OTHER PUBLICATIONS

Hong-Tai Chov, et al., "An Evaluation of Buffer Management Strategies for Relational Database Systems," 11th International Conference (Proceedings of VLDB 85, Stockholm), pp. 127-141.

Lang, et al., "Data Base Buffer Paging in Virtual Storage Systems," ACM Transactions on Data Base Systems, Dec. 1977, pp. 339-351.

Brian W. Kernighan & Dennis M. Richie, "The C Programming Language", Prentice Hall, 1978, pp. 89-142.

Jay Ranade, Mukesh Sehgal, Phyllis Elkind & Joseph Grossman, "DB2 Concepts, Programming, and Design", McGraw-Hill, 1991, pp. 3-43, 309-313.

*Primary Examiner*—Paul V. Kulik
*Attorney, Agent, or Firm*—Arnold, White & Durkee

[57] ABSTRACT

A method of dynamically expanding or contracting a DB2 buffer pool, a set of control blocks emulating certain DB2 control blocks is constructed. If the size of the buffer pool is to be increased, the buffer pool expansion routine used by DB2 to accommodate abnormally high storage demand is repeatedly invoked to perform the expansion. However, the contractable-page flag that is set by DB2 for each 4K or 32K page that is added to the buffer pool in this way, indicating that the added page should be removed from the buffer pool as soon as the high storage demand condition has ended, is reset. If the size of the buffer pool is to be decreased, pages are removed from DB2's three queues or chains used to manage the buffer pool, i.e., the never-used chain, the previously-used chain, and the in-use chain, in that order; in the latter two cases the pages are "removed" by marking them as contractable pages so that DB2 itself will soon remove the pages from the appropriate chain as part of its own normal processing.

2 Claims, 5 Drawing Sheets

FIGURE 3

| START: Initialize control blocks | | 3.1 |
|---|---|---|
| DB2 Release 2.3? | | 3.2 |
| YES: 3.3<br><br>Set CCB and ROB control block length variables to lengths of CCB and ROB in DB2 Release 2.3 | NO: 3.4<br><br>Set CCB and ROB control block length variables to lengths of CCB and ROB in DB2 Release 2.2 | |
| Program Temporary Fix (PTF) Release? | | 3.5 |
| YES:<br><br>Set EB length variable to Large  3.6 | NO:<br><br>Set EB length variable to Small  3.7 | |
| Set ACE length variable to Large  3.8 | Set ACE length variable to Small  3.9 | |
| Obtain & initialize ACE_X | | 3.10 |
| Initialize EB_X | | 3.11 |
| Obtain & initialize ROB_X | | 3.12 |
| Obtain & initialize CCB_X | | 3.13 |
| Obtain & initialize XSB_X | | 3.14 |
| Obtain & initialize STSV_X | | 3.15 |
| Obtain & initialize SKB_X | | 3.16 |
| RETURN | | |

FIGURE 4

| START: Expansion of Buffer Pool | |
|---|---|
| Is at least 10 MB of virtual storage available? | 4.1 |

| YES: Continue | NO: RETURN error code | 4.2 |
|---|---|---|

| Invoke DB2 routine DSNB1ABS | 4.3 |
|---|---|
| Clear contractable-page flag from new pages | 4.4 |
| Pages increased by more than one? | 4.5 |

| YES:      4.6 Decrease desired-pages count<br><br>Reset (clear) contractable-page flag on excess pages added by DB2 | NO: Continue      4.7 |
|---|---|

| Enough pages added to satisfy operator request? | 4.8 |
|---|---|

| YES: Continue    4.9 | NO: Repeat from step 4.3    4.10 |
|---|---|

| Overshoot (too many pages added)? | 4.11 |
|---|---|

| YES:      4.12<br>Set contractable-page flag on overshoot pages | NO: Continue      4.13 |
|---|---|

| RETURN | 4.14 |
|---|---|

METHOD OF DYNAMICALLY EXPANDING OR CONTRACTING A DB2 BUFFER POOL

BACKGROUND OF THE INVENTION

CROSS-REFERENCE

Related Applications: This application is one of four U.S. patent applications being filed simultaneously, all of which are commonly assigned, the other are:

Ser. No. 07/970,335, METHOD OF DYNAMICALLY CANCELING A DB2 THREAD, by David L. Janicek;

Ser. No. 07/970,334, METHOD OF DYNAMICALLY EXPANDING A DB2 EDM POOL, by David L. Janicek;

Ser. No. 07/970,336, METHOD OF DYNAMICALLY ADDING OR REMOVING DB2 LOGS, by Anouar Jamoussi and David L. Janicek.

Microfiche Appendix: The microfiche appendix to this specification consisting of 207 microfiche and 3 pages contains source code listings of a series of copyrighted computer program routines that are the property of the assignee of this application. Permission is granted to make copies of the appendix and its contents solely in the course of creating facsimile copies of a patent issuing on this application and for no other purpose. All other rights under copyright or similar law are reserved.

Glossary and Bibliography: A general-purpose glossary of certain terms of art and a list of potentially helpful references for further reading are set out at the end of the printed specification of this application. References are indicated in the text of the specification in conventional fashion, e.g., "[Smith]" might indicate an article by Smith. Both the glossary and the list of references are intended solely as an aid to understanding the invention and not as limiting the scope of the inventive subject matter defined in the claims.

The Problem of Fixed DB2 Buffer Pool Sizes

This invention relates to the use of database software such as the well-known DATABASE 2 database software distributed by IBM Corporation, commonly referred to colloquially in the art as "DB2." As is well known to those of ordinary skill, generally speaking DB2 operates as a subsystem in a computer system that itself is operating under the IBM MVS operating system software.

The invention particularly relates to a method for allowing DB2 users to obtain better throughput by dynamically manipulating the sizes of the buffer pools used for data input/output (I/O). More specifically, the invention relates to a method by which a user of a DB2 application can dynamically increase or decrease the amount of MVS virtual storage allocated to each of the (four) DB2 buffer pools.

FIG. 1 illustrates, in greatly simplified form, the relationship between (a) DB2, (b) an application program that makes use of DB2-provided services to read from and write to data storage, referred to as a "DB2 application," and (c) a user who communicates with the DB2 appliication via communications management software such as, e.g., the well-known IBM Virtual Terminal Access Method (VTAM) software.

The present version of DB2 defines four buffer pools, in which virtual storage space exists in 4K or 32K pages. When a table space (i.e., a data set) is defined by a DB2 application, the table space is assigned to a specific one of these four buffer pools. DB2 "opens" a given buffer pool, i.e., issues an MVS macro instruction to allocate virtual storage for the buffer pool, only on the first occasion when a DB2 application actually requests that data be read from or written to a table space associated with the buffer pool. DB2 maintains the buffer pool, keeping control of all memory allocated to the buffer pool, until all data sets using the buffer pool are closed by the associated DB2 application(s).

It has long been known that the respective sizes of the buffer pools can directly affect the performance of the DB2 application programs. As DB2's workload fluctuates during the day, and also as the non-DB2 MVS workload fluctuates, the demand on MVS's virtual storage capabilities can fluctuate as well. A buffer pool of fixed size therefore is likely to be nonoptimal at any given time.

Heretofore, "tuning" of the buffer pool size for improved performance has not been feasible as a practical matter. In DB2's present version, the size of a buffer pool can be expanded or contracted only by bringing down DB2 (i.e., terminating the execution of DB2), changing the parameters defining the size of the particular buffer pool, and bringing DB2 back up. The process of bringing DB2 down for the purpose of making parameter changes, then bringing it back up again, is sometimes referred to as "cycling" DB2. Cycling of DB2 frequently results in serious inconvenience to users of DB2 because bringing down DB2 necessarily causes an outage (i.e., unavailability) of all application programs that use DB2. Thus, data bases supported by those application programs become unavailable to users for the duration of the outage.

SUMMARY OF THE INVENTION

A novel method of dynamically expanding or contracting a DB2 buffer pool without the necessity of cycling DB2 is disclosed below. A set of control blocks emulating certain DB2 control blocks is constructed. If the size of the buffer pool is to be increased, the buffer pool expansion routine used by DB2 to accommodate abnormally high storage demand is repeatedly invoked to perform the expansion. However, the contractable-page flag that is Set by DB2 for each 4K or 32K page that is added to the buffer pool in this way, indicating that the added page should, be removed from the buffet pool as soon as the high'storage demand condition has ended, is reset. If the size of the buffer pool is to be decreased, pages are removed from DB2's three queues or chains used to manage the buffer pool, i.e., the never-used chain, the previously-used chain, and the in-use chain, in that order; in the latter two cases the pages are "removed" by marking them as contractable pages so that DB2 itself will soon move the pages from the appropriate chain as part of its own normal processing.

BRIEF DESCRIPTION OF THE DRAWINGS

FIG. 3 is a flow chart of particular steps used in building a data structure to emulate certain control blocks used by DB2.

FIGS. 4 and 5 are flow charts in simplified form depicting steps executed in an illustrative implementation of a method in accordance with the invention.

DETAILED DESCRIPTION OF SPECIFIC EMBODIMENTS

Figure 1:
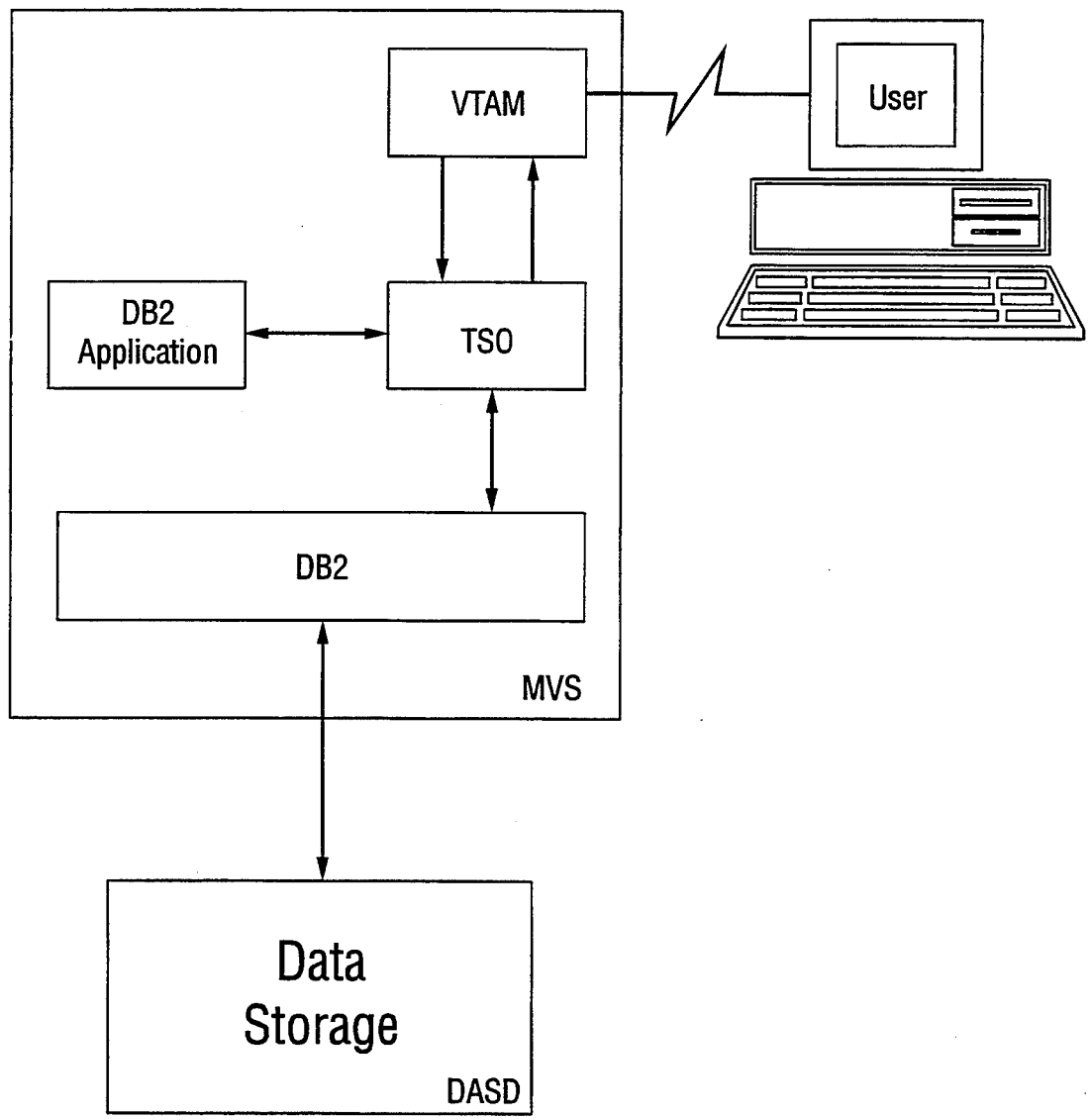
FIG. 1 is a block diagram showing in greatly simplified form the relationship between DB2 and a DB2 application program.
Figure 2:
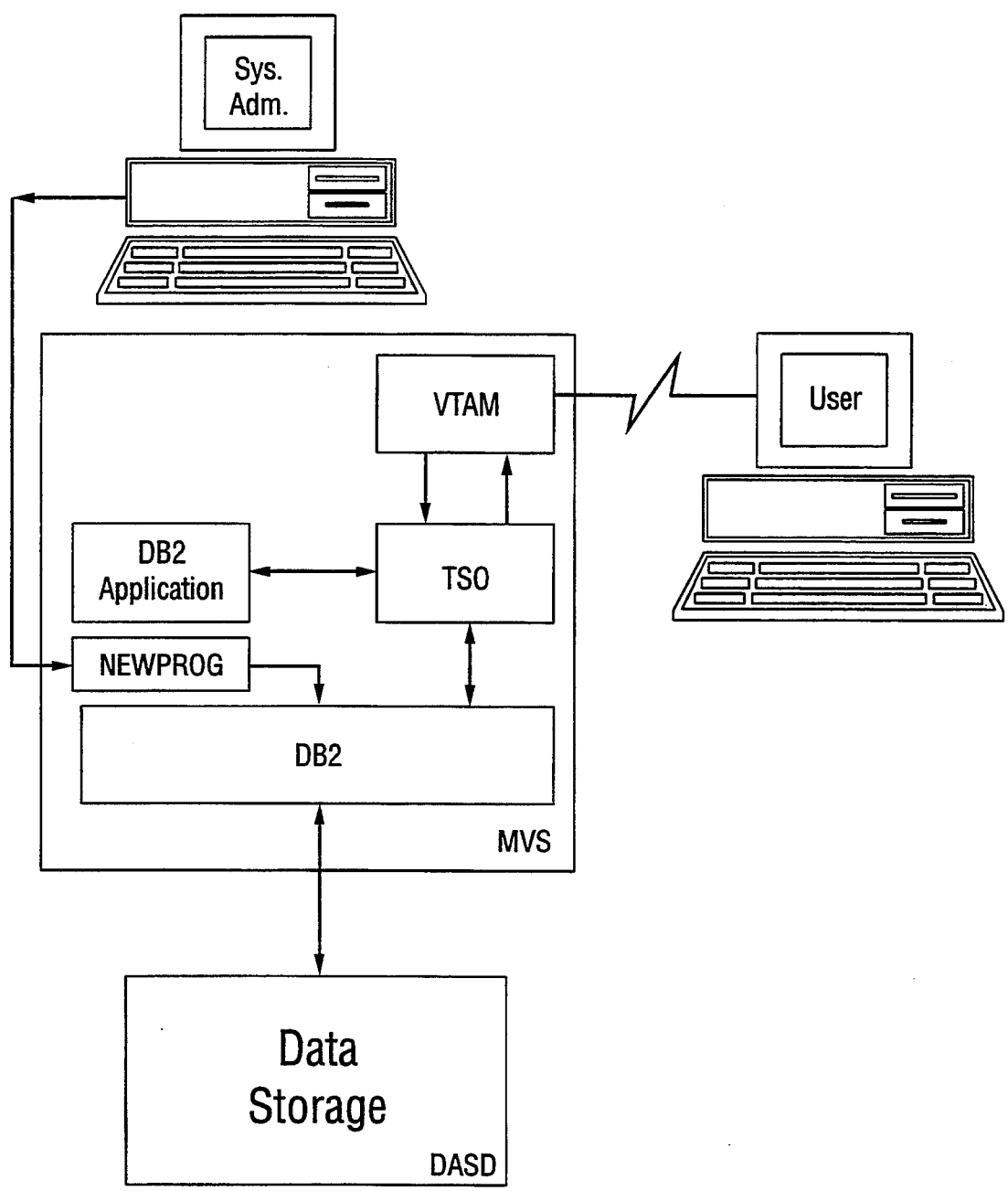
FIG. 2 is a similar block diagram in which a computer program in accordance with the invention is added in to that relationship.

One illustrative embodiment of a method in accordance with the invention is described below as it might be implemented in a computer program (referred to here for convenience as "NEWPROG"). An actual implementation of such a program might be executable on, e.g., an IBM System 370-compatible machine or equivalent running IBM OS/VS SP2 (MVS/XA), SP3 or SP4 (MVS/ESA) and IBM Database 2 (DB2) version 1.3 or later, or on one or more other suitable computer systems. For purposes of further illustration, the microfiche appendix sets out selected extracts of source code from an actual software package owned and distributed under license by the assignee under the trademark OPERTUNE.

In the interest of clarity, not all features of an actual implementation are described in this specification. It will of course be appreciated that in the development of any such actual implementation (as in any software development project), numerous programming decisions must be made to achieve the developers' specific goals and subgoals (e.g., compliance with system- and business-related constraints), which will vary from one implementation to another. Moreover, attention will necessarily be paid to, e.g., proper serialization to handle concurrent events. It will be appreciated that such a development effort might be complex and time-consuming, but would nevertheless be a routine undertaking of MVS system program development for those of ordinary skill having the benefit of this disclosure.

When invoked by a user such as a DB2 system administrator, NEWPROG carries out the method of expanding the buffer pool to a specified number N by issuing a request to the MVS operating system that a main routine, labeled as module DDTCSBP in the microfiche appendix, be scheduled for execution under an SRB (service request block). That main routine performs the functions described below.

Initialization: Building a Model of the DB2 Environment

As illustrated in FIG. 3, NEWPROG performs as a prelude a series of definition and environment-value lookup steps (each of which by itself is conventional), then builds a data structure to emulate certain control blocks used by DB2 to store parameters about the thread. While some of these control blocks are documented in various DB2 information manuals, others are undocumented and had to be determined empirically. The address of the control block SCOM for the DB2 environment being modeled is used as an input; the address of a control block referred to as EB_X, emulating the DB2 control block of the same name for the thread in question, is returned as an output.

Block 3.2: It has been found that different releases of DB2 may make use of CCB and ROB control blocks that are of the same name and general structure but of different lengths. In particular, DB2 releases prior to 2.3 use CCB and ROB control blocks of different lengths than those of release 2.3. Whether the DB2 installation is release 2.3 is tested by a conventional examination of the operating system's DB2 installation information in the DECP control block. Variables containing the lengths of DB2's CCB and ROB control blocks are initialized to the appropriate values depending on whether the DB2 release is 2.3 or earlier.

Block 3.5: If a Program Temporary Fix (PTF) is in effect, the EB and ACE control blocks in DB2 will have different lengths than otherwise. Accordingly, NEWPROG determines whether a PTF is in effect by conventional examination of operating system information, and sets a flag iPTF if so. If the iPTF flag is set, then respective variables defining the length of the EB and ACE control blocks are set to respective Large values, else to respective Small values.

It has been determined empirically that DB2 apparently maintains unique identifying codes for various control blocks such as the ACE control block. Most of those codes may be determined conveniently by "running the chains" of the DB2 control blocks (referring to the documentation of those control blocks in the aforementioned IBM publications) to locate the control block of interest, then calling a dump analysis package such as IPCS distributed by IBM, or the DB2 dump formatting utility such as the program DSNWDMP provided with DB2, to examine the control block and thereby obtain its identifying code.

Block 3.10: An ACE_X control block, for emulating DB2's ACE control block of the same name, is created and initialized by obtaining a segment of free storage (the size or length of which was determined in the steps beginning at block 3.2) with a GETMAIN statement. That storage is obtained from subpool 241; it may be either above or below the 24-bit; addressable storage line, and must be in Key 7 storage. Initialization of the ACE_X control block includes determining whether the EB control block for the DB2 installation will have a structure reflecting a DB2 PTF release, by checking whether the iPTF flag is set. Initialization also includes writing (i) the length of the ACE_X control block and (ii) the unique DB2 identifying code of the ACE control block being emulated, into the appropriate locations in the ACE_X control block. Later in the initialization, the address of the EB_X control block will also be recorded in the ACE_X control block.

Block 3.11: Because the ACE control block in DB2 includes the EB control block, initialization of the ACE_X control block also includes setting up an EB_X control block, as part of the ACE_X control block, to emulate the EB control block of DB2. The EB_X control block is initialized by writing to that control block (i) the length of the EB_X, as determined above, (ii) the DB2 identifying code of the EB, (iii) a pointer to the DB2 control block RMVT, (iv) the EB flag A, (v) the EB flag D, (vi) the EB's home ASCE, and (vii) a flag indicating whether the routine running at any particular time is running in the DB2 master address space or in the DB2 data base's address space.

Block 3.12: Similar steps are performed to obtain and initialize a control block ROB_X. Again, a GETMAIN is performed to obtain a block of free Key 7 storage from subpool 241; the length of the block is the variable iROBLEN, determined in block 3.2 as described above. The address of this block of storage, i.e., the new ROB_X control block, is recorded in the ACE_X control block. The ROB_X control block is initialized by recording in: it (i) the unique DB2 identifying code of the ROB, (ii) the length of the ROB_X, and (iii) a pointer back to the ACE_X control block. Thus, a chain of pointers has been created from the ACE_X control block to the EB_X control block to the ROB_X control block and back to the ACE_X control block.

Block 3.13: A control block CCB_X is created and initialized in similar fashion. Again, a GETMAIN is performed to obtain a block of free Key 7 storage from subpool 241; the length of the block is the the variable iCCBLEN, determined as described above. The address of this block of storage, i.e., the new CCB_X control block, is recorded in the ACE_X Control block. The CCB_X control block is initialized by recording in it (i) the unique DB2 identifying code of the CCB, (ii) the length of the CCB_X, and (iii) in the field corresponding to the user identification field of DB2's CCB control block, an identifier indicating that the user is the Install SYSADM (i.e., the installation system administrator, who by definition has unlimited access privileges in DB2).

Block 3.14: A control block XSB_X, emulating the MVS control block of the same name, is obtained by executing a GETMAIN to obtain a block of free Key 7 storage in subpool 241. The XSB is used by MVS to handle SRBs that are suspended and then later resumed. Storage for XSB_X may be taken from below the 16-meg line to take into account the possibility that some older versions of MVS's SRB dispatcher may assume that the XSB is located in this region of storage. The block of storage for the XSB_X may have a fixed length (i.e., the size of the MVS control block XSB), and therefore the required size of the block need not be determined as it was for the ACE, EB, ROB, and CCB.

Block 3.15: Another GETMAIN is used to obtain storage for an SRB status save area control block STSV_X in Key 7 storage, subpool 241, of fixed length, below the 16-meg line. The STSV_X is initialized to include a pointer to the XSB_X control block; in addition, the address of the STSV_X is saved as a pointer in the EB_X control block.

Block 3.16: A stack storage block SKB_X, to emulate the DB2 control block of the same name, is obtained and initialized. The size of the SKB_X is dependent on whether the release of DB2 is prior to release 2.20. A GETMAIN is issued to obtain a block of free Key 7 storage in subpool 241 below the 16-meg line. The SKB_X is initialized by recording in it (i)the unique DB2 identifying code of the SKB, (ii) the length of the SKB, (iii) a pointer to the EB_X control block, (iv) a "bottom" field indicating the last byte of the SKB_X, (v) an "available" field pointing to an area in the SKB_X that is available for use by application programs, (vi) a pointer to a current segment CSEG that points to itself, and (vii) a counter field that is initialized to a value of 1.

A pointer is returned to the newly built EB_X control block. An emulation or model environment has thus been created wherein the EB_X points to the ROB_X which in turn points to the ACE_X which points back to the EB_X. The EB_X control block also points to the STSV_X which points to the XSB_X and to the EB_X which in turn points to the SKB_X. This environment provides a standard set of control blocks that are useful in calling various specific DB2 routines for execution as discussed below (other control blocks may be built on an as-needed basis).

An additional control block BBRA_X is built to emulate the DB2 control block BBRA or Buffer Block Route Area. Free memory for this control block is obtained from subpool 230. The control block ID and size as well as an eyecatcher field are initialized as shown in the microfiche appendix. Likewise, the address of the BBRA_X control block is placed in the first word of the standard register save area to conform to the conventions expected by the DB2 routines that are called as discussed below.

Testing Whether Dynamic Modification is Necessary

On comparatively rare occasions, almost no action will be needed to expand or contract a buffer pool because no open data sets are assigned to the buffer pool. To take that possibility into account, NEWPROG tests for the existence of a WPH or Window (buffer) Pool Header standard DB2 control block for the buffer pool in question. The WPH control block exists only if there are data sets open that are assigned to the buffer pool in question. If the WPH control block does not exist, NEWPROG simply changes the buffer pool size values in the DB2 control block SPRM (installation system parameters), so that the next time the buffer pool is opened by DB2, it is opened with the appropriate allocation of virtual storage.

Expanding the Buffer Pool

If the WPH does exist and: the requested modification of the buffer pool size is an expansion, then NEWPROG estimates whether the virtual storage assigned to the DB2 address space might approach a critically low level if the expansion request were to be fulfilled (because fully exhausting the virtual storage could cause an abnormal termination or "abend" of DB2). Specifically, NEWPROG verifies, at block 4.1, that at least 10 megabytes of virtual storage would remain available to the DB2's address space if the expansion request were to be completed; if not, the buffer pool expansion request is rejected with an appropriate information message to the requesting user as shown at block 4.2.

If sufficient virtual storage space appears to be available, then NEWPROG calls the DB2 module DSNB1ABS as many times as necessary (in 4K or 32K increments as appropriate) to satisfy the expansion request, as illustrated in block 4.3. The DSNB1ABS module in DB2 apparently is designed to accommodate situations in which demand for buffer pool storage is abnormally high, by temporarily allocating additional storage space to the buffer pool in question but then deallocating it as soon as the high demand condition has passed. It appears to do so by setting one or more flags indicating that the added page or pages are contractable. The current version of DB2 appears to set the X'40' bit in the WPHGTBD field of the DB2 control block WPHG that is associated with the 56-page group in which the page in question is classified, and also to set a bit in a 56-bit map to indicate for each page whether the page is contractable. When the need for temporary additional storage has passed, DB2 removes the contractable page or pages from the buffer pool in question. Therefore, for each call to DSNB1ABS that NEWPROG makes, it also resets, i.e., clears, the flag(s) so that the new page in the buffer pool is no longer marked as contractable, as shown in block 4.4.

After each call to DSNB1ABS, NEWPROG checks the current number of 4K or 32K pages allocated to the buffer pool in question as shown in block 4.5. If that number has increased by more than one, it follows that DB2 made a call to DSNB1ABS on its own. NEWPROG therefore (i) notes that fact, (ii) reduces by one the number of page increments to be added to achieve the desired expansion of the buffer pool, and (iii) to the extent that overshoot of the desired number of added pages has not occurred, resets (clears) the contractable-page flag for the page or pages added by DB2 on its own in the same manner as described above, thus saving itself one call to DSNB1ABS, as illustrated in block 4.6. (The microfiche appendix does not reflect this resetting step.) Because the contractable-page flags are left set for any excess pages that result in such overshoot, the overshoot will be automatically corrected by DB2 when it contracts contractable pages.

Contracting the Buffer Pool

NEWPROG's contraction of a buffer pool in response to a user request takes advantage of the fact that DB2 maintains three types of queues or chains of pages in a buffer pool. The IN USE chain is a chain of pointers to pages that not only contain data but also are assigned to a DB2 application, i.e., the DB2 application is actively using the data at the time in question. Pages on the IN USE chain should not be released from the buffer pool before being released by the DB2 applications using them. The PREVIOUSLY USED ("LRU") chain is a chain of pointers to pages that are not currently in use, but are "cached" for possible reuse if the owning DB2 applications attempt to reaccess them. Finally, the NEVER USED chain is a chain of pointers to pages that are either empty or that have been affirmatively declared empty (made available for recycling, so to speak) by a DB2 application.

Figure 5:
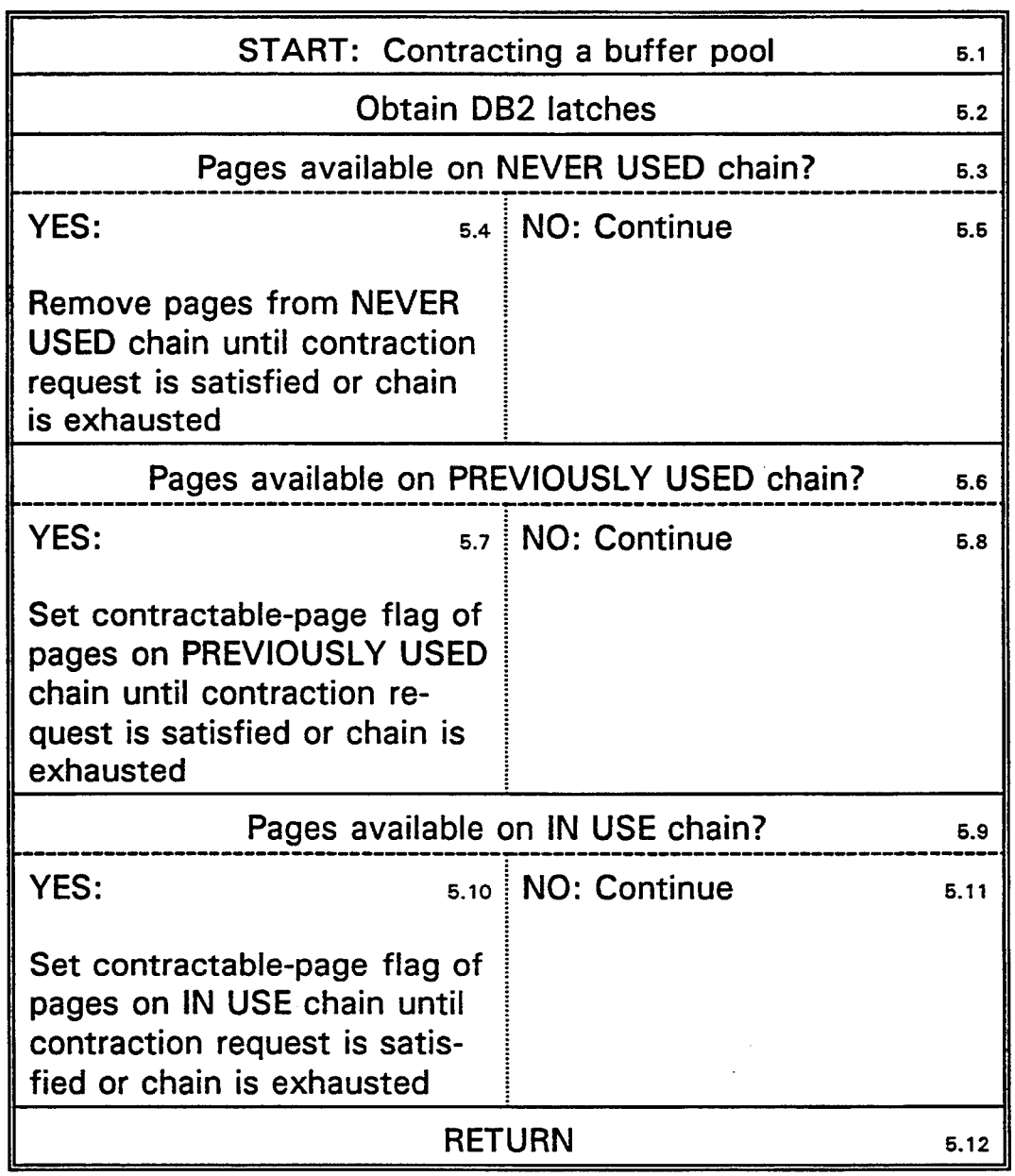

Referring to FIG. 5, NEWPROG contracts a buffer pool by first obtaining certain DB2 latches as indicated in the microfiche appendix and shown at block 5.2, to reduce the chance of inadvertent data corruption. As illustrated beginning at block 5.3, NEWPROG begins removing from the buffer pool any pages whose pointers are found on the NEVER USED chain by calling the CONTRACT function set forth in the DDTCCON module of the microfiche appendix until that chain is exhausted or the contraction request is satisfied.

As illustrated beginning at block 5.6, NEWPROG moves on to the LRU chain if removal of pages on the NEVER USED chain proves insufficient to satisfy the contraction request. It begins setting the "contractable page" flag, discussed above, for pages on the LRU chain (beginning at the head of the chain) until (1) that chain is exhausted, or (2) the contraction request is satisfied, i.e., the number of pages for which the flag is thus set, if any, plus the number of pages removed from the NEVER USED chain as discussed above, if any, equals (or satisfactorily approximates) the number of pages to be removed. This approach takes advantage of the fact that the marked pages will be freed the next time DB2 attempts to satisfy a read request from the LRLI chain: in making such an attempt, DB2 checks each page on the LRU chain that is examined in that attempt and that does not satisfy the read request to determine whether the page has its "contractable page" flag set; if so, DB2 removes the page from buffer pool in question.

Finally, as shown beginning at block 5.9, NEWPROG "removes" pages from the IN USE chain if necessary to satisfy the contract request. It does so by marking the "contractable page" flag for pages on the IN USE chain in a similar manner as for pages on the LRU chain as discussed in the previous paragraph, beginning from the head of the chain. When the DB2 application that owns a particular page releases the page, DB2 checks to determine whether the contractable page flag is set, and if so, removes the page from the buffer pool as discussed above.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application.

GLOSSARY

The following general-purpose glossary is provided solely as a convenient aid to understanding for readers who may not be familiar with particular terms of art. The inclusion of a term in this Glossary should not be interpreted as necessarily being completely definitive of the meaning of the term, nor as necessarily limiting or expanding the scope of any claim.

16-megabyte line: Term used in some computer systems to denote the upper boundary of the first 16 megabytes of main memory. Sometimes referred to as the 24-bit line (because a sequence of 24 bits can be arranged in on-off combinations to define individual addresses for 16 megabytes of main memory locations).

24-bit line: See 16-megabyte line.

_X: When applied to a name as a suffix, used to identify a control block, a routine, etc., created to emulate (partially or completely) a corresponding control block, routine, etc., of DB2. For example, ACE_X is used to denote a control block created to emulate the DB2 control block ACE.

ACE: A DB2 control block.

Address: The "location" of, e.g., a specific variable in memory, a specific input/output device on an input/output bus, etc. Typically, the term "location" actually refers to a unique identifier assigned to the variable, device, etc.; operations such as "writing" data to be stored in a particular portion of memory are accomplished by "broadcasting" the data to all portions of memory along with the identifier (address) of the memory portion that should actually receive and store the data.

Address space: An MVS term used to identify a collection of tasks used to perform a set of functions. (Primary address space, secondary address space)

Address space control block: An MVS control block encoding information about, and used to represent, an address space.

Ancestor chain: A chain Of TCBs, each created by the previous TCB in the chain. As a hypothetical example, the ancestor chain of TCB-3 might be as follows: TCB-1 creates TCB-2, which in turn creates TCB-3.

API: Acronym for Application Program Interface, in essence a language or set of communications conventions by which an application program and an operating system can transmit work requests, status reports, etc., to each other.

ASCB: Acronym for address space control block.

ASCE: A DB2 control block. An ASCE exists for each address space that has a thread to DB2.

Asynchronous: If a first "agent" such as a process, a machine, etc., issues a request for a second agent to perform some work, the first agent might either suspend its own operations after issuing the request until it receives a report back from the second agent; this is commonly referred to as synchronous processing. Alternatively, the first agent might continue its own operations after issuing the request, often on the assumption that it will be notified when the second agent has completed its work; this is commonly referred to as asynchronous processing.

CCB: A DB2 control block identifying an individual thread.

Code: (a) Instructions for execution by a processor in a computer system. See also Source code, Executable code. (b) In DB2, a unique two-byte identifier assigned to a DB2 control block.

Computer program: A set of statements or instructions used directly or indirectly in a computer in order to ;bring about a certain result. Depending on the context, a computer program may:comprise either or both of source code and executable code.

Control block: A data structure created and/or utilized by a computer program to keep track of information during the program's execution. A control block is roughly analogous to a set of working notes kept by the program. Depending on its design, a program may create, use, and/or discard several control blocks during its execution. See also Structure.

DB2: A common nickname or acronym for the Database 2 software system distributed by International Business Machines Corporation (IBM), extensively documented in various IBM publications such as [DB2 DIAG].

EB: Acronym for "event block," a DB2 control block used to track a unit of work in DB2.

EUT: See Enable-Unlocked-Task.

Enable-Unlocked-Task: A task which has no processing restrictions.

Executable code: A series of one or more instructions executable after suitable processing by a computer or other programmable machine, without compilation or assembly.

Field: A defined part of a data record or data structure; roughly equivalent to a variable. For example, in a data base of employee information, the field "Employeename" in the data record for a given employee would be set to that employee's name. See also Control Block, Structure, Variable.

Flag: Typically, a true-false indicator as to some specified condition, or an "option A/option B" indicator.

FRR: See functional recovery routine.

Functional recovery routine: In the IBM MVS operating system, an error handling routine which can be used to recover from and/or obtain information about unanticipated program execution errors.

Initialize: (a) With respect to a variable, setting the variable to a specified value; Co) with respect to a routine, establishing initial conditions for execution of the routine.

INSTALL SYSADM: Used to denote DB2 installation system administrator; signifies the highest level of user/operator privilege in a DB2 installation.

Key 7 storage: Memory or other storage in a computer system whose contents can be altered only if the requestor possesses the appropriate "key," in this case Key 7.

Latch: In DB2, a flag or token used to serialize access to a shared resource. A DB2 thread that has been given exclusive access to such a resource is said to "hold the latch" for that resource. Associated with each thread is an EBLTCHLD flag word in storage that is used as a bit map of latches held by the thread.

Local lock: In the IBM MVS operating system, the lock is a mechanism to serialize the use of a particular shared resource. A call to the MVS function SETLOCK by a process causes MVS to attempt to obtain access to the resource for the process. If the resource is available, then the requesting process is "given the lock." If the resource is not available, i.e., if another process already has the lock, then the requesting process is suspended until the other process gives up the lock, indicating that its use of the shared resource is complete for the time being.

Maintenance release: A release of a computer program or software system that corrects actual problems with the program or system or that provides code for handling potential problems, typically problems discovered since the issuance of the previous release. Maintenance releases sometimes include additional capability or functionality for the computer program. See also PTF, Release.

Module: A portion of a computer program; sometimes referred to as a routine or a subroutine depending on the context.

MVS: IBM's MVS operating system, extensively documented in various IBM publications such as [MVSXA].

Operating system program: A computer program that manages some or all of a computer system and its hardware.

Pointer: A variable whose value is set to the address of, e.g., a memory location. For example, in some situations a particular field in a control block might be defined to be a pointer to another control block. A useful general introduction to pointers can be found in Chapter 5 of [K&R].

Primary address space: The default address space in which access to data and instructions is to be performed.

Processor system: A central processing unit (CPU) and one or more coprocessors (e.g., math or graphics co-processors) associated with the CPU.

PTF: Acronym for "Program Temporary Fix," typically a computer program maintenance release that is not given a separate release number. See also Maintenance Release.

Record: In a database, a single set of formatted data. For example, in a database of employee information, a record might constitute all information about a given employee that is kept in that database. Data in a record is commonly divided into fields. See also Field, Structure.

Release: In the software industry, the term "release" typically refers to a (usually numbered) version of a completer program or software system distributed to licensees. Release numbering often takes the form "major.minor," e.g., release 1.0 signifies the first major release of a program that is distributed to licensees, while release 1.1 signifies the first minor release of that first major release. See also Maintenance release.

RMVT: A DB2 control block.

ROB: A DB2 control block.

Routine: A portion of a computer program; sometimes referred to as a subroutine or a module depending on the context.

Running the chains: Colloquial expression used to describe following a chain of pointers to arrive at an Nth data structure, i.e., examining a first data structure to obtain the address of a second data structure; examining the second data structure to obtain the address of a third data structure; and so forth.

SCOM: A DB2 control block.

Secondary address space: An address space used by some CPU instructions to access data.

SETLOCK: An MVS macro instruction; see "local lock."

Source code: A series of instructions or statements in an English-like high-level computer language such as FORTRAN, C, PASCAL, or LISP, or in a relatively low-level language such as the assembly language for a particular processor. Source code is normally readily readable by humans trained in the particular computer language in question. It is normally transformed by an interpreter or compiler into machine-readable executable code for actual use on a computer.

SRB: Acronym for Service Request Block. In the MVS operating system, one way in which an application program can request that work be performed by MVS is to create an SRB—a formatted control block defining the work request in conformance with the MVS API—and to pass the address of the SRB to MVS with a request to perform the work specified in the SRB. See also API, TCB.

Status Save Area: An MVS control block.

Structure: As defined in [K&R], "a collection of one or more variables, possibly of different types, grouped together under a single name for convenient handling. (Structures are called 'records' in some languages, notably Pascal.)" A useful introductory discussion of structures is set out in [K&R] chapter 6. See also Control Block.

Subpool: An identification code used to group or associate different blocks of storage.

Subroutine: A portion of a computer program; sometimes referred to as a routine or a module depending on the context.

Synchronous: See "asynchronous."

SYSADM: Acronym for System Administrator.

System variable: A variable defined and maintained by an operating system program.

TCB: Acronym for Task Control Block, an MVS control block.

Thread: In DB2, an information connection or attachment between DB2 and another MVS subsystem utilizing DB2's services. DB2 keeps track of each thread through the use of various control blocks such as the ACE.

Timeout: Temporary or permanent cessation of a process, subroutine, etc., upon the occurrence of an event such as the passage of a specified period of time, the performance of a certain number of repetitions of a process, and the like.

Variable: A location in memory associated with a particular identifier and set to a particular value by a computer program, e.g., by an application program or an operating-system program. For example, a computer program for processing employee payroll information might define a variable EmployeeName that, at a particular time, is set to the value "Smith."

XSB: An MVS control block; used to handle SRBs that are suspended and later resumed.

BIBLIOGRAPHY

The following bibliography is included for convenient reference.

[K&R] Brian W. Kernighan & Dennis M. Richie, The C Programming Language (Prentice Hall 1978)

[DB2 DIAG] IBM Database 2, Version 2, Diagnosis Guide and Reference, manual no. LY27-9536.

[MVSXA] MVS Extended Architecture Debugging Handbook, Manual #LC28-1169 (IBM).

RanSeh] Jay Ranade, Mukesh Sehgal, Phyllis Elkind, & Joseph Grossman, DB2 Concepts, Programming, and Design (McGraw-Hill, Inc., 1991).

What is claimed is:

1. A method of dynamically adding a page to a DB2 buffer pool without cycling DB2, comprising:
    (a) calling a DB2 routine that temporarily adds a page to the buffer pool and sets a contractable-page flag for said page; and
    (b) clearing said contractable-page flag.

2. A method of dynamically contracting a DB2 buffer pool by a specified number of pages without cycling DB2, in response to a contraction request from an operator, comprising:
    (a) removing from the buffer pool any padres queued on DB2's NEVER USED chain until either (1) no pages remain queued on the NEVER USED chain, or (2) the contraction request is satisfied;
    (b) if step (a) does not result in satisfaction of the contraction request, then setting a contractable-page flag for each of successive pages queued on DB2's PREVIOUSLY USED chain until either (1) the contraction request is satisfied, or (2) the contractable-page flag has been set on all said successive pages; and
    (c) if steps (a) and (b) do not result in satisfaction of the contraction request, then setting a contractable-page flag for each of successive pages queued on DB2's IN USE chain until either (1) the contraction request is satisfied, or (2) the contractable-page flag has been set on all said successive pages.

* * * * *

UNITED STATES PATENT AND TRADEMARK OFFICE
CERTIFICATE OF CORRECTION

PATENT NO. : 5,440,692
DATED : August 8, 1995
INVENTOR(S) : David L. Janicek

It is certified that error appears in the above-indentified patent and that said Letters Patent is hereby corrected as shown below:

Column 12, line 32, the word "padres" should be --pages--.

Signed and Sealed this

Twenty-fourth Day of October, 1995

Attest:

BRUCE LEHMAN

*Attesting Officer*     *Commissioner of Patents and Trademarks*